US010029624B2

(12) United States Patent
Diersmann et al.

(10) Patent No.: US 10,029,624 B2
(45) Date of Patent: Jul. 24, 2018

(54) SHEET METAL MOLDING FOR MOTOR VEHICLES AND PROCESS FOR PRODUCING A SHEET METAL MOLDING FOR MOTOR VEHICLES

(75) Inventors: Holger Diersmann, Westerkappeln (DE); Jochen Dörr, Bad Driburg (DE); Jochem Grewe, Salzkotten (DE); Andreas Hitz, Erwitte (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 766 days.

(21) Appl. No.: 13/813,857

(22) PCT Filed: Jul. 29, 2011

(86) PCT No.: PCT/EP2011/003822
§ 371 (c)(1),
(2), (4) Date: Feb. 1, 2013

(87) PCT Pub. No.: WO2012/016667
PCT Pub. Date: Feb. 9, 2012

(65) Prior Publication Data
US 2013/0127197 A1 May 23, 2013

(30) Foreign Application Priority Data

Aug. 2, 2010 (EP) .................................... 10008039

(51) Int. Cl.
| B21D 22/00 | (2006.01) |
| B60R 13/02 | (2006.01) |
| B21D 22/02 | (2006.01) |
| B21D 35/00 | (2006.01) |
| C21D 8/04 | (2006.01) |
| C21D 9/46 | (2006.01) |
| C22C 21/06 | (2006.01) |
| C22F 1/047 | (2006.01) |

(52) U.S. Cl.
CPC .............. B60R 13/02 (2013.01); B21D 22/00 (2013.01); B21D 22/022 (2013.01); B21D 35/005 (2013.01); C21D 8/04 (2013.01); C21D 9/46 (2013.01); C22C 21/06 (2013.01); C22F 1/047 (2013.01)

(58) Field of Classification Search
CPC ..................................................... C22C 21/06
See application file for complete search history.

(56) References Cited

U.S. PATENT DOCUMENTS

| 4,090,889 A | 5/1978 | George et al. |
| 4,324,596 A | 4/1982 | Wuebker |
| 4,405,385 A | 9/1983 | Clostermans-Huwaert |
| 7,810,873 B2 | 10/2010 | Hitz et al. |
| 7,823,939 B2 | 11/2010 | Handing et al. |
| 7,971,887 B2 | 7/2011 | Doerr et al. |
| 8,020,907 B2 | 9/2011 | Wibbeke et al. |
| 8,043,681 B2 | 10/2011 | Handing et al. |
| 8,146,986 B2 | 4/2012 | Bierkamp et al. |
| 8,201,861 B2 | 6/2012 | Handing et al. |
| 8,256,830 B2 | 9/2012 | Hitz et al. |
| 8,267,463 B2 | 9/2012 | Buschsieweke et al. |
| 8,312,629 B2 | 11/2012 | Hitz et al. |
| 8,486,206 B2 | 7/2013 | Litalien et al. |
| 2006/0130941 A1 | 6/2006 | Litalien et al. |
| 2009/0148721 A1* | 6/2009 | Hibino ................... B21D 22/20 428/650 |
| 2010/0218860 A1 | 9/2010 | Dörr et al. |
| 2012/0018422 A1 | 1/2012 | Bohner et al. |

FOREIGN PATENT DOCUMENTS

| DE | 29 50 379 | 6/1980 |
| DE | 60 2004 009 545 | 8/2008 |
| DE | 10 2009 008 282 A1 | 8/2010 |
| EP | 1 748 088 | 1/2007 |
| JP | 2009-012041 | 1/2009 |
| WO | WO 2004/076092 | 2/2004 |
| WO | WO 2008/059242 | 5/2008 |
| WO | WO 2010/032002 | 3/2010 |

OTHER PUBLICATIONS

Europäische Norm EN 515 (European Norm), 1993.
English translation of European Norm EN 515, 1993.
Morris, Larry et al., "Warm forming high-strength aluminum automotive parts" SAE Technical Paper, vol. 770206, 1977.
Aluminum Association, International Alloy Designations and Chemical Composition Limits for Wrought Aluminum and Wrought Aluminum Alloys "Teal Sheets", 2009.
The Aluminum Association, "ASM Specialty Handbook" JR Davis Davis & Associates, 1993.

* cited by examiner

Primary Examiner — Jessee R Roe
Assistant Examiner — Jophy S. Koshy
(74) Attorney, Agent, or Firm — Henry M. Feiereisen LLC

(57) ABSTRACT

A motor vehicle sheet metal molding of the invention is produced by hot forming from a metal sheet composed of an aluminum alloy which cannot be precipitation hardened, which contains at least magnesium and optionally manganese in addition to aluminum as alloy component. The motor vehicle sheet metal molding after forming has, at least locally, degrees of deformation which are above the forming limit curve of the aluminum alloy at room temperature. To produce the motor vehicle sheet metal molding, the metal sheet is heated at least locally to a temperature in the range from 200° C. to 400° C. over a period of from 1 to 60 seconds. The heated metal sheet is subsequently placed in a forming tool of a forming press and formed to produce the motor vehicle sheet metal molding.

6 Claims, No Drawings

SHEET METAL MOLDING FOR MOTOR VEHICLES AND PROCESS FOR PRODUCING A SHEET METAL MOLDING FOR MOTOR VEHICLES

CROSS-REFERENCES TO RELATED APPLICATIONS

This application is the U.S. National Stage of International Application No. PCT/EP2011/003822, filed Jul. 29, 2011, which designated the United States and has been published as International Publication No. WO 2012/016667 A1 and which claims the priority of European Patent Application, Serial No. 10008039.9, filed Aug. 2, 2010, pursuant to 35 U.S.C. 119(a)-(d).

BACKGROUND OF THE INVENTION

The invention relates to a motor vehicle sheet metal molding made of a non precipitation-hardenable aluminum alloy and a method for producing a motor vehicle sheet metal molding.

It is known to produce highly stressed vehicle components made of aluminum sheet metal, primarily using precipitation-hardenable alloys. The conventional production process is the forming of the aluminum sheet metal of low strength with subsequent ageing for achieving increased strength.

In aluminum alloys in which no strength increase by heat treatment (natural or artificial ageing) can be achieved, an increase of strength can only be achieved via deformation. In order to also be able to produce complex geometries from sheet metals of these alloys, these are usually deformed, like precipitation-hardenable alloys, in a soft state. This means that these non precipitation-hardenable aluminum alloys are for example soft annealed beforehand.

A disadvantage is that pressed parts which are produced by deformation of these soft annealed non precipitation-hardenable aluminum sheet metals only experience a significant increase in strength in regions of high deformability, with the result that the potential for lightweight construction using moldings from economically favorable non precipitation-hardenable aluminum alloys is relatively low. This is also the reason why non precipitation-hardenable aluminum alloys are predominantly used in the chassis area as thick-walled components. Non precipitation-hardenable aluminum alloys are characterized mostly by very good corrosion resistance. In addition, they are often used in non high performance components, however, without the focus on particular lightweight construction.

In order to satisfy the current and future demands for the weight optimization of vehicles, the goal has to be to save weight in all components. This also applies to components made of non precipitation-hardenable aluminum alloys. These aluminum alloys are available as sheet metal of higher or high strength which are produced by cold rolling or by cold rolling with targeted re-annealing. To date, however, no complex components can be produced from these commercially available semi finished parts, even though this would be economically interesting because of the possible weight reduction and the material savings.

The invention is based on the object to provide a high-quality motor vehicle sheet metal molding made of aluminum alloys, and which has improved component properties, and a high strength and/or a higher ductility at the same strength.

The invention is further based on the object, to provide a possibility how to produce a complex component of high strength can be produced by forming from sheet metals made of roll hardened non precipitation-hardenable aluminum alloys.

DETAILED DESCRIPTION OF THE INVENTION

The part of the object relating to the device is solved by a motor vehicle sheet metal molding made by a process including the steps of heating at least portions of a sheet metal made of a non precipitation-hardenable aluminum alloy which contains aluminum and magnesium, wherein the sheet metal is of a material state defined by a temper designation according to European norm EN515:1993 selected from the group consisting of H12, H14, H16, H18, H19, H22, H24, H26, H28, H32, H34, H36 and H38; and forming the sheet metal into the motor vehicle sheet molding, wherein at least regions of the motor vehicle sheet metal molding have a degree of deformation above a forming limit curve of the sheet metal at room temperature.

The motor vehicle sheet metal molding is produced from a non precipitation-hardenable aluminum alloy which according to the European standard EN 515:1993 is in the material state H12, H14, H16, H18, H19, H22, H24, H26, H28, H32, H34, H36 or H38 and contains beside aluminum as alloy component at least magnesium and optionally manganese. The motor vehicle sheet metal molding is produced by hot forming, wherein at least portions of the starting sheet metal are heated and the starting sheet metal is subsequently formed into the motor vehicle sheet metal molding. The motor vehicle sheet metal molding has at least locally degrees of deformation, which are above the forming limit curve of the aluminum alloy or the starting sheet metal at room temperature. European Standard EN 515:1993 establishes temper designations for all forms of wrought aluminum and aluminum alloys and for continuously cast aluminum and aluminum alloy drawing stock and strip intended to be wrought.

The forming limit curve is an important parameter with regard to the forming. Each material has its individual forming limit curve which is usually determined according to Nakajima or Maciniak by means of cupping tests on sheet metal samples. The forming limit curve describes the maximal formability of a material. When the degree of forming exceeds the forming limit values and lie above the forming limit curve, neckings or cracks can form in the component. As a result of overextended regions with impermissible decrease in material thickness, a component safety is not guaranteed.

According to the invention, motor vehicle sheet metal moldings made from sheet metals made of roll hardened aluminum alloys are provided which cannot conventionally be produced. A motor vehicle sheet metal molding according to the invention has at least locally degrees of deformation which cannot be produced from the starting material at room temperature or in which primary and secondary deformations occur which the material would not be able to endure without formation of cracks in the cold state or at room temperature. Conventionally produced, the deformation capacity of the material at room temperature would be exceeded during forming and a failure due to cracks would result. Such cracks do not occur in the motor vehicle sheet metal molding according to the invention.

The motor vehicle sheet metal molding according to the invention is made of a non precipitation-hardenable aluminum alloy or a sheet metal made of such an aluminum alloy. This sheet metal was formed into a complex three dimensional motor vehicle sheet metal molding by forming. The here at least locally implemented degrees of deformation are such that the component cannot be produced cold for example from a sheet metal in the material state H111 according to standard EN 515. Only the hot forming performed according to the invention enables invention enables the production of the motor vehicle sheet metal molding according to the invention which is of high quality without material flaws or material weakening having a high strength or a higher ductility at the same strength than conventionally produced motor vehicle sheet metal moldings from aluminum alloys.

In sheet metal forming, the forming limit curve (also referred to as forming limit diagram)—as previously described—has established itself for describing the formability. The forming limit curve describes the failure threshold at different forming and tension states. In a forming limit curve, failure by necking or the occurrence of cracks is shown specific for the respective material. These sites of failure are determined in various tests and the forming limit curve is then generated for the different materials by plotting the main forming degree φ1 against the secondary forming degree φ2.

The forming limit curve allows determining the process limits in the forming of sheet metal materials and thus serves for assessing the deformation properties of sheet metals. Principally, the distance of the deformation measured on a formed component to the forming limit curve is a measure of the safety in the production of drawn parts. By means of analyzing the deformation and comparison with the forming limit curve, a reliable assessment of the forming process of sheet metals thus occurs. The forming limit curve illustratively defines the quality of the material and thus supports the user in selecting the right material. This is where the invention comes into play. Within the framework of the invention, it was recognized that a motor vehicle sheet metal molding made of an aluminum alloy of the claimed type can be produced for producing components with high strength and/or ductility, wherein this motor vehicle sheet metal molding has degrees of deformation which cannot be realized conventionally. Thus, the motor vehicle sheet metal molding is characterized in that it has at least locally degrees of deformation which are above the forming limit curve of the aluminum alloy or the starting sheet metal made of this aluminum alloy at room temperature.

In a motor vehicle sheet metal molding according to the invention, the yield strength $R_{p0.2}$ compared to the starting sheet metal is reduced by maximally 30%. Further, the motor vehicle sheet metal molding has a yield strength $R_{p0.2}$ which is at least 20% higher than the yield strength of a comparable motor vehicle sheet metal molding, which is formed from a sheet metal made of an aluminum alloy in the temper designation O/H111 according to the European standard EN 515:1993. State O means soft annealed. State O can refer to products in which the properties demanded for the soft annealed state are achieved by hot forming methods.

Temper designation H111 means annealed and slightly strain hardened by subsequent work steps for example stretching or straightening (less than H11).

As mentioned, the yield strength $R_{p0.2}$ of a motor vehicle sheet metal molding according to the invention is significantly increased by at least 20% compared to a conventionally produced motor vehicle sheet metal molding. A motor vehicle sheet metal molding made of a 1 mm thick sheet metal which conventionally has a yield strength $R_{p0.2}$ of 110 N/mm$^2$, has now a yield strength $R_{p0.2}$ of 132 N/mm$^2$ or higher. In a motor vehicle sheet metal molding made from a 1 mm to 3 mm thick sheet metal, a yield strength $R_{p0.2}$ of 105 N/mm$^2$ is conventionally demanded. A motor vehicle sheet metal molding of this wall thickness has a yield strength $R_{p0.2}$ of at least 126 N/mm$^2$. Motor vehicle sheet metal moldings made from sheet metal with a wall thickness of greater than 3 mm conventionally should have a yield strength $R_{p0.2}$ of 100 N/mm$^2$. According to the invention, a motor vehicle sheet metal molding of this wall thickness and made of the aluminum alloy as claimed has a yield strength $R_{p0.2}$ of at least 120 N/mm$^2$.

The part of the object relating to the method is solved by a method for producing an open sheet metal molding including the steps of providing a sheet metal made of a roll hardened, non precipitation-hardenable aluminum alloy comprising aluminum and magnesium, wherein the sheet metal is in a material state defined by a temper designation according to European standard EN515:1993 selected from the group consisting of H12, H14, H16, H18, H19, H22, H24, H26, H28, H32, H34, H36 and H38; heating at least a portion of the sheet metal to a temperature in a range from 200° C. to 400° C. within a time period of 1 to 60 seconds; inserting the heated sheet metal into a forming tool of a forming die; forming the sheet metal into the sheet metal molding; and cooling the sheet metal molding to a temperature below 200° C. within 60 seconds after the heating.

The method for producing a motor vehicle sheet metal molding according to the invention can be described as follows:

An important step of the invention is that the sheet metal (starting sheet metal) is heated to a temperature in the range between 200° C. and 400° C., in particular less than 370° C., and the heating and the production by pressing of the component is performed within a time period of 1 to 60 seconds, after which the heated sheet metal is inserted into a forming die and formed into the sheet metal molding.

Preferably, the sheet metal is then cooled to a temperature smaller than 200° C. within 60 seconds after the heating, preferably by forming in a tool, whose temperature is smaller than 200° C., or is cooled in a device after the forming below 200° C.

In particular, the heated sheet metal is placed into a cold forming tool wherein a cold forming tool relates to an unheated or not externally heated forming tool.

Within the framework of the invention, the formed sheet metal is actively cooled. Principally, however, a passive cooling is also conceivable in which the sheet metal or the formed sheet metal molding is removed from the forming die and cooled under ambient conditions without additional cooling measures.

With the conventional heating methods to temperatures to about 300° C. a large portion of the strength is lost during heating in the furnace. However, it has been shown that the re-crystallization as well as the regeneration of the structure depends on a temperature-time threshold. Therefore, it is provided to heat a roll hard non precipitation-hardenable aluminum sheet metal which according to the European standard EN515:1993 whose disclosure is hereby incorporated by reference, is in the material state H12, H14, H16, H18, H19, H22, H24, H26, H28, H32, H34, H36 or H38 and as alloy component beside aluminum contains at least magnesium and optionally manganese, at a very high speed and then form it in a cold forming tool so fast that a predominant portion of the strength is retained in the entire component. According to claim 2 the yield strength $R_{p0.2}$ of the produced motor vehicle sheet metal molding compared to the starting sheet metal is reduced by maximally 30%. Experiments have shown that above an alloy depending threshold from temperature and holding period a steep drop of the properties of the cold component occurs wherein in particular the yield strength $R_{p0.2}$ is significantly reduced. In particular the temperature dependent threshold of the process window is very narrow, but also the holding time is increasingly more critical when the temperature-time threshold is approached. In order for the deformation capacity to be sufficiently great however, a comparatively high temperature of up to 300° C., depending on the component geometry, is required to achieve the forming, from this depending on the alloy, a relatively small process window can result. Generally, the manufacturing process is associated with a slight loss of strength with increasing heating and holding time at the temperatures required for forming so that according to the invention, overall times at temperature which are as short as possible are desired. Because certain tact times cannot or only associated with uneconomical effort be fallen below for the handling after the heating and the pressing of the sheet metals, a heating up which is as fast as possible offers the best possibilities to produce components with a strength which is close to the strength of the starting sheet metal. For this, the sheet metal has to be heated to a temperature of at least 200° C. and at most 400° C., preferably 250° C. to 370° C., in particular 270° C. to 300° C. The associated heating time for the method according to the invention are at 1 to 60 seconds, and with this significantly below the ones which are possible in a conventional furnabe heating to the mentioned temperatures. The heating can therefore occur resistively, conductively, inductively, or capacitively. Wherein the period of heating as describe above is preferably shorter and should be below 45 seconds, in particular for temperatures above 250° C. below 30 seconds.

Preferably, the sheet metal—as described—is heated within a time period of 1 to 30 seconds and formed within maximally 60 seconds and cooled at least locally below 260° C.

The European standard EN515 governs the nomenclature of basic states of aluminum semi finished products. The letter H means strain hardened. This term applies to products which for ensuring the defined mechanical properties are subjected after soft annealing (or after the hot forming) to a cold forming or a combination of cold forming and recovery annealing or stabilizing. The letter H is followed by two digits, the first for indicating the type of the thermal treatment, the second for indicating the degree of the strain hardening.

Cold forming relates to the plastic deformation of a metal at a temperature and speed which leads to a strain hardening. Strain hardening is the change of the metal microstructure by cold forming which leads to increased strength and hardness, wherein the formability decreases.

The temper designation H1x only designates strain hardened products which for achieving the desired strength are strain hardened without additional thermal treatment.

The temper designation H2x means strain hardened and re-annealed. This applies for products which are strain hardened in excess of the desired final strength and in which the strain hardening is decreased to a desired strength by re-annealing.

The temper designation H3x means strain hardened and stabilized and applies to strain hardened products whose mechanical properties are stabilized by a thermal treatment at low temperature or by a heating carried out during processing. Stabilizing improves generally the forming capability. This designation only applies to alloys which decrease in strength during storage in the absence of stabilizing.

The second digit after the H indicates the final degree of the strain hardening which is characterized by the minimal values of tensile strength. The digit 8 is assigned to the hardest states, which are usually produced. The digit 9 indicates states whose minimal tensile strength exceeds the states H8x by 10 MPa or more. The digits 2, 4 and 6 indicate intermediate states. Accordingly, H12 means strain hardened ¼ hard, H14 strain hardened-½ hard, H16 strain hardened-¾ hard and H18 strain hardened-4/4 hard (fully hardened). Accordingly, H22/24/26/28 designate strain hardened and re-annealed materials or respectively the temper designations H32/34/36/38 designate strain hardened and stabilized materials. Overall, sheet metals are therefore to be used which are roll hardened and with this have been subjected to a strain hardening by rolling.

The invention has the advantage that a relatively complex component can be produced from a roll hardened non precipitation-hardenable aluminum alloy, which in its entirety or in sub regions has a high strength. The particular feature is that the sub-regions of high strength do not depend on the deformation and the introduced degrees of deformation. This provides an alternative manufacturing path compared to precipitation-hardenable alloys which due to significantly higher costs of the semi finished products and heat treatment of the component which lasts up to 24 hours are associated with high production costs.

An open sheet metal molding according to the invention, is a component produced from a sheet metal blank by pressing, i.e., from a component which in its starting state is essentially flat. The starting material was strain hardened to a defined target value by rolling. An open sheet metal component according to the invention does not mean a hollow section.

Within the framework of the invention, the roll hardened non precipitation-hardenable aluminum sheet metal is preferably heated in its entirety and formed. However, a partial hot forming is also conceivable, in that the sheet metal has regions which are heated for different periods of time, be it to achieve different target temperatures or to influence the local deformation properties of the sheet metal or the tensile strength by the duration of the heating.

The sheet metal can preferably be heated resistively, conductively, inductively, or capacitively.

After the forming of the sheet metal, portions of the sheet metal or the sheet metal molding can be further held at temperature or heated in a device.

With the method on which the invention is based, it is also possible to produce components which are to have a high strength only, in defined regions, wherein the components can have a targeted lower strength in other regions, at simultaneous improved elongation values. This is geared toward producing a component which is generally improved compared to an entirely hard component, and which, in particular with regard to the deformation behavior in case of an accident, has more favorable properties, be it with regard to energy absorption or with regard to weight saving.

Within the framework of the invention it is also possible to continue the heating of the sheet metal during the forming process, which heating differs regionally in strength and duration. For this, the forming tool can have a forming recess with at least one region which is heated. As an alternative or in addition to heated sites in the tool, cooled regions can also be provided. The heated regions in the forming tool offer the possibility to hold the work piece within an additional period of time at a higher temperature by heating a defined region for an extended period of time.

In a multi-step forming, forming recesses can also be provided in further tool steps, which are partially heated. In the same manner, a temporally extended or higher heating is possible in a process step following the forming by means of a partially acting furnace or an inductor. It is regarded as useful however, to realize the variant involving higher heating temperature prior to the forming and not subsequent to the forming.

Automobile parts, which currently are preferably manufactured in precipitation-hardenable alloys and in the future can advantageously be replaced for motor vehicle sheet metal moldings according to the invention are:
A, B, C—columns
Longitudinal members (sill, center tunnel)
Cross members (seat-/roof-)
Crash boxes
Bumper-cross members
Reinforcement sheet metals in general
Reinforcement sheet metals in the floor region
Front wall cross members (up, center, down)
Heel plate cross beams
Door parapet
Suspension-strut dome Automobile parts which are currently produced from soft non precipitation-hardenable alloys and can in the future be advantageously replaced for motor vehicle sheet metal moldings according to the invention are:
Door inner panels
Shear areas
Floor panels
Rear hatch inner panel+hood inner panel
Cross beam (seat-/roof-)
Reinforcement panel in general
Reinforcement panel in the floor region
Front wall cross beam (up, center, down)
Heel plate cross member
Longitudinal cross member (sill, center tunnel)

Crash tests have shown that motor vehicle sheet metal moldings produced according to the invention have a surprisingly high ductility, this means great deformations of the components are possible without failure due to cracks. In addition, the tests have shown that the energy absorption in case of a crash at same intrusion is 15% higher than in sheet metal moldings made from the same alloy which, however, were not subjected to the method according to the invention. Even greater is the difference in energy absorption until the initiation of the plastic deformation, due to the high $R_{p0.2}$. This is important for components which are intended to conduct high (crash) forces, without plastically deforming themselves (for example bumper cross members).

What is claimed is:

1. A method for producing an open sheet metal molding comprising the steps of:
   providing a sheet metal made of a roll hardened, non precipitation-hardenable aluminum alloy comprising aluminum and magnesium, said sheet metal being in a material state defined by a temper designation according to European standard EN515:1993 selected from the group consisting of H12, H14, H16, H18, H19, H22, H24, H26, H28, H32, H34, H36 and H38;
   heating at least a portion of the sheet metal to a temperature in a range from 250° C. to 370° C. within a time period of 1 to 60 seconds;
   inserting the heated sheet metal into a forming tool of a forming die;
   forming the sheet metal into the sheet metal molding; and
   actively cooling the portion of the sheet metal molding to a temperature below 200° C. within 60 seconds after the heating by placement in a cold forming tool.

2. The method of claim 1, wherein the aluminum alloy further comprises manganese.

3. The method of claim 1, wherein the sheet metal is heated in the heating step to a temperature in a range from 270° C. to 350° C.

4. The method according of claim 1, wherein the portion of the sheet metal has regions which are heated to different temperatures prior to the forming step.

5. The method of claim 1, wherein the portion of the sheet metal has regions which are heated for different respective periods of time.

6. A method for producing an open sheet metal molding comprising the steps of:
   providing a sheet metal made of a roll hardened, non precipitation-hardenable aluminum alloy comprising aluminum and magnesium, said sheet metal being in a material state defined by a temper designation according to European standard EN515:1993 selected from the group consisting of H12, H14, H16, H18, H19, H22, H24, H26, H28, H32, H34, H36 and H38;
   heating at least a portion of the sheet metal to a temperature in a range from 250° C. to 370° C. within a time period of 1 to 30 seconds;
   inserting the heated sheet metal into a forming tool of a forming die;
   forming the sheet metal into the sheet metal molding; and
   actively cooling the portion of the sheet metal molding at least locally to a temperature below 200° C. by placement in a cold forming tool, wherein the forming and cooling step are performed within 60 seconds after the heating step.

* * * * *